US005628258A

United States Patent [19]

Zwahlen et al.

[11] Patent Number: 5,628,258

[45] Date of Patent: May 13, 1997

[54] CASH VAULT WITH A VAULT CONTROL UNIT TO BE OPERATED SELECTIVELY BY TWO TELLERS

[75] Inventors: Fritz Zwahlen, Ammerzwil; Robert Brügger, Bern, both of Switzerland

[73] Assignee: Ascom Autelca AG., Gumligen, Switzerland

[21] Appl. No.: 301,492

[22] Filed: Sep. 7, 1994

[30] Foreign Application Priority Data

Sep. 23, 1993 [DE] Germany ........................ 93 14 341 U

[51] Int. Cl.[6] ........................ G06F 17/60; E05G 1/00

[52] U.S. Cl. ........................ 109/45; 235/379; 271/303; 109/46; 109/66

[58] Field of Search ........................ 109/24.1, 45, 46, 109/47, 48, 49, 53, 66, 55; 235/379; 271/298, 303; 221/252

[56] References Cited

U.S. PATENT DOCUMENTS

| | | | |
|---|---|---|---|
| 4,577,763 | 3/1986 | Placke et al. | 235/379 |
| 4,669,393 | 6/1987 | Wüthrich | 271/303 |
| 4,699,272 | 10/1987 | Kokubo et al. | 235/379 |
| 4,728,090 | 3/1988 | Oota et al. | 271/279 |
| 5,016,546 | 5/1991 | Haueter | 109/66 |
| 5,250,788 | 10/1993 | Sugai et al. | 235/379 |
| 5,427,036 | 6/1995 | Fee et al. | 109/53 |
| 5,488,913 | 2/1996 | Fumanelli | 109/55 |

FOREIGN PATENT DOCUMENTS

| | | | |
|---|---|---|---|
| 0290731A2 | 11/1988 | European Pat. Off. . | |
| 0329034 | 8/1989 | European Pat. Off. | 271/298 |
| 0290731B1 | 7/1993 | European Pat. Off. . | |
| 2026220 | 1/1980 | United Kingdom . | |

*Primary Examiner*—Darnell M. Boucher

*Attorney, Agent, or Firm*—Birch, Stewart, Kolasch & Birch, L.L.P.

[57] ABSTRACT

A cash vault (1) has vault control unit (7) to be operated alternately by two tellers (4*a*, 4*b*), with only a single banknote disbursement (11) and input unit (39). The disbursement opening of banknote disbursement unit (11) is closeable by a two-part cover (13*a*, 13*b*) with only that opening part which is adjacent to the pertinent teller (4*a*, 4*b*) being cleared at the time for currency disbursement. In this way, allocation of the amount of money made available to one of the two bank employees takes place without problems. The second bank employee cannot take the banknote bundle made available to the first bank employee even inadvertently. For path selection of banknotes from banknote input unit (39) to a banknote repository (35) or to banknote disbursement unit (11) or from the banknote repository to the banknote disbursement unit (11), a bar-shaped path selection element rotatable about its longitudinal axis is used. The path selection element is traversed by at least one longitudinal slot.

8 Claims, 3 Drawing Sheets

CASH VAULT WITH A VAULT CONTROL UNIT TO BE OPERATED SELECTIVELY BY TWO TELLERS

The invention relates to a cash vault with a vault control unit to be operated selectively by two tellers, with only a single banknote disbursement unit.

BACKGROUND OF THE INVENTION

A cash vault is defined as a device which is intended for procurement of money, especially banknotes. Preferably cash vaults are set up in the counter rooms of banking institutions and after input of a security code they make available a desired amount of money. Depending on the security precautions in the counter rooms, a maximum stipulated amount of money is stored in a money repository within the cash vault. Cash vaults can now be operated directly by the bank customer or the bank employee. The cash vault described below is operated selectively by two bank employees, but could also be operated by two bank customers at the same time.

SUMMARY OF THE INVENTION

In GB-A 2 026 220 a cash vault is described which can be operated by one bank employee standing to the left and one bank employee standing to the right of it. In order that one does not mistakenly remove the banknotes from the cash vault made available to the other in an almost simultaneous money request of the two bank employees, the sole banknote disbursement opening in a vertical wall of the cash vault has a right and a left slide. The right slide is pushed out when the amount made available is intended for the bank employee standing to the left. The analogous situation applies to the left slide.

The invention solves the problem of devising a cash vault with an ergonomic, attractively-designed vault control unit with only single banknote disbursement for two bank employees, in which there is unencumbered allocation of the amount of money made available to one of the bank employees. The second bank employee cannot take the bundle of banknotes made available to the first bank employee even in case of carelessness. Special attention was devoted to ensuring ease of servicing in the configuration of the vault control unit.

In GB-A 2 026 220 the banknote disbursement opening is arranged in a vertical front wall; the teller must therefore always reach into an opening into which he cannot see. In the invention, on the other hand, the disbursement opening of the disbursement unit is covered by a two-part cover, the pertinent component cover which is nearest the bank employee for whom the made available banknotes are intended being opened at the time.

Preferably the cover is arranged such that when the latter is closed the upper and side walls and edges of the vault control unit are optically continued without noteworthy interruption.

Since the disbursement opening with the component cover opened can be easily inspected from above and can be felt only laterally, unlike in GB-A 2 026 220, secure access of the bank employees is possible. This secure and fast access is also improved by the trapezoidal shape of the longitudinal disbursement opening.

Due to the possibility of easily removing the vault control unit from the top side of the vault base unit which contains the money repository, it was possible to achieve special ease of servicing in the correction of an banknote jam which may occur. The vault base unit on its top side has only one narrow slot through which the banknotes from the money repository are pushed in or out in order to be deposited in the latter. That is, when the vault base unit is removed there is sufficient protection against unauthorized access to the banknote repository. The banknotes are made available to the conveying means inside the banknote repository. Service operations on the vault control unit can thus be undertaken at any time without a security risk, even in the presence of customer traffic in the counter hall.

The advantageous configuration of a bar-shaped path selection element for the banknotes which can be swiveled around its longitudinal axis and which is traversed by two longitudinal slots allows simple routing to the desired destinations and sorting out of the banknotes. In addition, adaptation to different sheet metal thicknesses of the upper cover of the vault base unit can be easily done.

The configuration of the cover of the input unit with a lever arrangement which pushes a banknote pressure plate perpendicularly to a feed plate for the banknotes allows the inputted banknotes to be pressed unencumbered, while the cover is closing, against a side wall which has a banknote isolation roller. With only a few mechanical elements which interact with the cover, a continuation slot for the isolated banknotes is pressed and released.

BRIEF DESCRIPTION OF THE DRAWINGS

In the following, embodiments of the cash vault according to the invention are detailed using drawings.

DETAILED DESCRIPTION OF THE INVENTION

Figure 1:
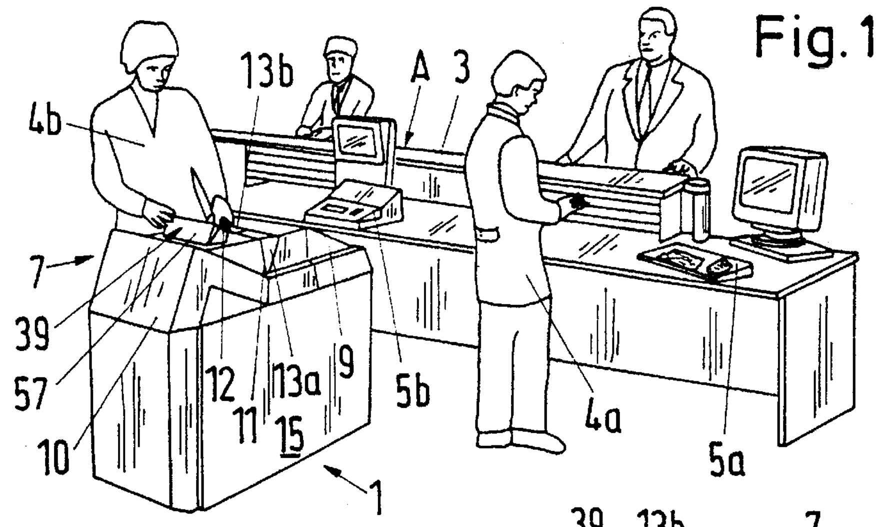
FIG. 1 shows a cash vault in a counter room with two data input devices for one bank employee each.

FIG. 1 shows cash vault 1 to be operated by two bank employees 4*a* and 4*b* as tellers. Cash vault 1 is separated from the bank customers by counter 3. Two bank employees 4*a* and 4*b* stand to the right and to the left next to cash vault 1. Each of two bank employees 4*a* and 4*b* has terminal 5*a* and 5*b* respectively for electronic data control of bank vault 1, for debiting, banknote disbursement and input, etc.

Figure 2:
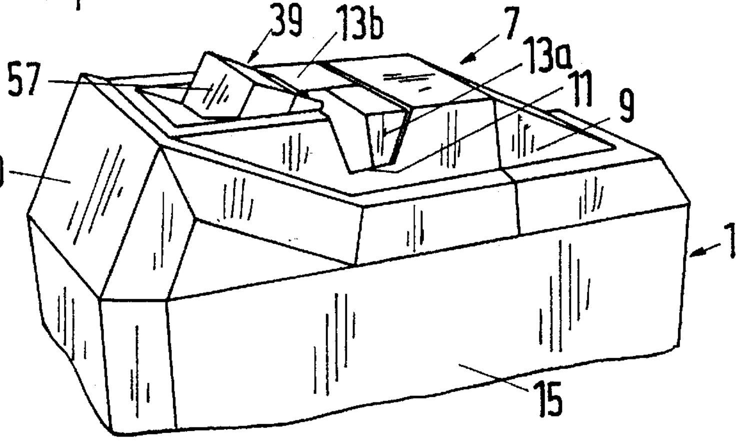
FIG. 2 shows a side view of a vault control unit of the cash vault.

At the top cash vault 1 has vault control unit 7 which can be removed for servicing and which is shown in FIG. 2 in a larger representation, with its front part 9 which can be removed separately from rear part 10, in order to be able to push cash vault 1 partially under counter 3 in order to save space.

On the upper side of rear part 10 of vault control unit 7 is disbursement unit 11 and input unit 39 for banknotes. Disbursement unit 11 can be completely closed with two-part cover 13*a* and 13*b*. Right component cover 13*a* can be opened and closed independently of the left one 13*b*. In FIG. 1, right cover 13*a* is shown closed and left component cover 13*b* open. Bank employee 4*b* standing on the left side of cash vault 1 has free access from top left to banknote bundle 12 made available in disbursement unit 11 for disbursement. Since right component cover 13*a* of disbursement unit 11 is closed, bank employee 4*a* standing on the right side of cash vault 1 has no access into disbursement unit 11.

For better understanding, left component cover 13*b* is shown completely closed and right component cover 13*a* partially open. There is no partial opening in operation. With the representation in FIG. 2 only operation of component covers 13*a* and 13*b* and the fact that they are comprised of two parts is shown.

Disbursement unit 11 is formed as a trapezoidal longitudinal opening which runs transversely horizontal with open front sides at the top on vault control unit 7. The cover of vault control unit 7 extends barely over the upper edge of vault base unit 15 for reasons of configuration. Within vault base unit 15 is banknote repository 35 as illustrated in FIG. 4.

Figure 3:
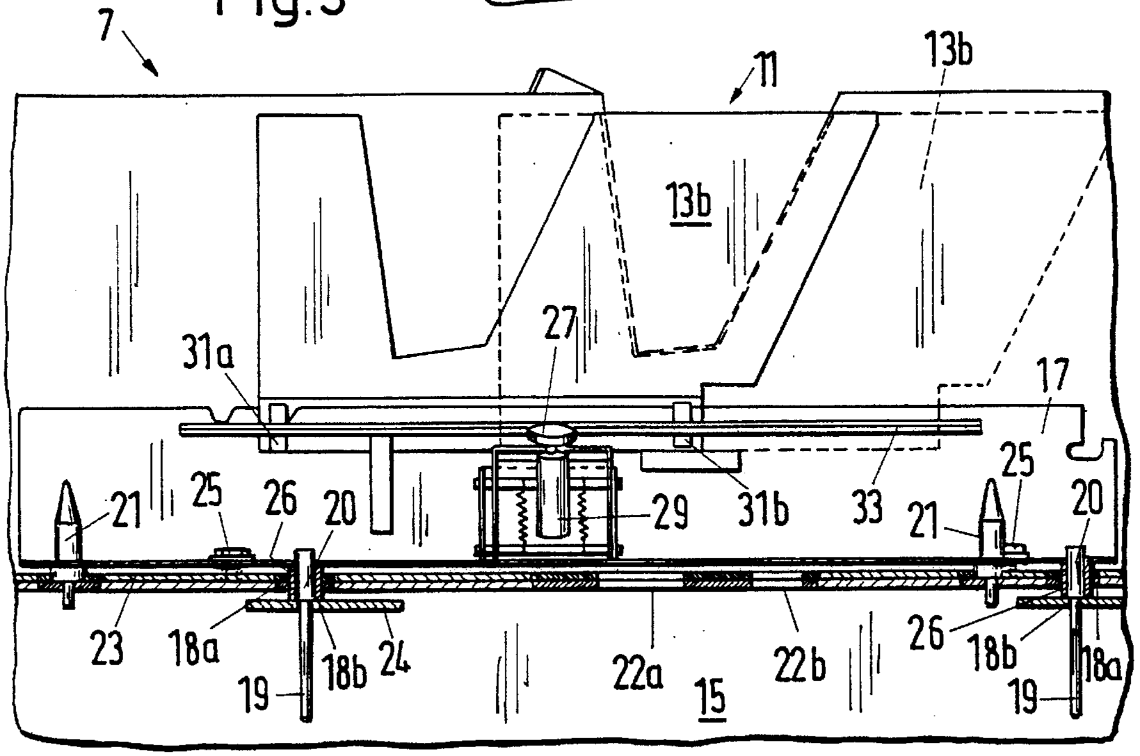
FIG. 3 shows a longitudinal section through the vault control unit of the cash vault.

Vault control unit 7 is held on vault base unit 15 with the possibility of removal by means of retaining unit 17 shown in FIG. 3. The clear distance of retaining unit 17 from one upper wall 23 of the vault base unit 15 depends on the thickness of this wall 23. Depending on the required security conditions of the banking institution, this thickness can be varied. Based on these different thicknesses, the distance of retaining unit 17 from the inside of wall 23 or from reference plate 24 located at a defined distance to the inside must be set exactly when cash vault 1 is being installed, in order that the banknotes can be transferred from banknote repository 35 to vault control unit 7 without problems. To adjust the height of retaining unit 17, four cylinder-shaped mounting pins 19 (only two are visible in FIG. 3) are used in banknote repository 35 removed from vault base unit 15. Mounting pins 19 have enlarged upper part 20. They are first inserted with their thin cross-section through continuous hole 18*a* in wall 23 and continuous hole 18*b* in reference plate 24. Mounting pins 19 at this point on their transition from the thin cross-section to thicker upper part 20 rest on the edge of the drilled hole of reference plate 24. At this point spacer sleeve 26 is placed over each upper part 20. The height of spacer sleeve 26 is a measure of the distance of retaining unit 17 from vault wall 23, i.e., from reference plate 24. At the locations labelled with reference number 25 are threaded bolts not shown on wall 23. A total of four threaded bolts are used. At this point a first nut which is likewise not shown is screwed onto these threaded bolts. At this point retaining unit 17 is seated on mounting pins 19. It now rests on the upper front side of spacer sleeves 26. The first nuts on the threaded bolts at the location with reference number 25 are screwed upwards from the side of cash vault 1 outward with a wrench until the bottom of retaining unit 17 is seated on them, without being lifted off of the upper front side of spacer sleeves 26. Then retaining unit 17 is again removed, each of the mounting pins 19 with spacer sleeve 26 in place is removed and retaining unit 17 is again seated on the first nuts on the threaded bolts at locations 25. A second nut shown at locations 25 in FIG. 3 is screwed onto the threaded bolts and braced against the first one. Retaining unit 17 is now mounted in the correct horizontal and vertical position to vault base unit 15. The correct horizontal position is dictated by the position of continuous holes (not shown) intended for the threaded bolts in the bottom of retaining unit 17. The position of slip-on vault control unit 7 to retainer unit 17 is fixed via three alignment pins 21, of which only two are shown in FIG. 3. After removing mounting pins 19, banknote repository 35 can again be inserted since they are no longer present in its free space.

Each of covers 13*a* and 13*b* can be pushed horizontally to open and close by means of frictional wheel 27 which engages on its sides. Each of frictional wheels 27 is driven by electric motor 29 which presses it elastically against the pertinent cover. Each electric motor 29 is controlled via a driver stage (not shown) of a computer (not shown) connected to terminals 5*a* and 5*b*. Each cover 13*a* and 13*b* on its lower side is carried to move horizontally and perpendicularly with two guide elements 31*a* and 31*b* on guide bar 33 located on retaining unit 17.

Figure 4:
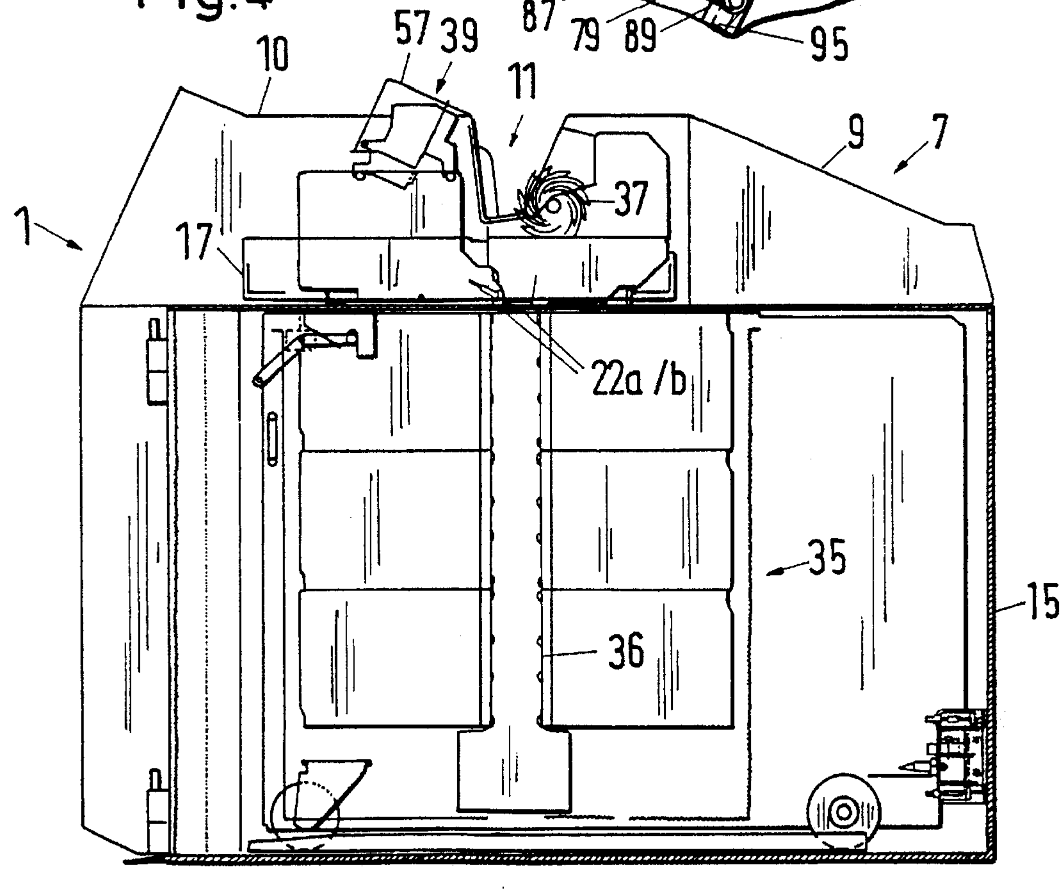
FIG. 4 shows a schematic of a cross section through the cash vault.

FIG. 4 shows a schematic cross-section through the entire cash vault 1. From banknote repository 35 located in vault base unit 15, the banknotes are transported upward with conveying means 36 to vault control unit 7 and are deposited there by deposition wheel 37 in disbursement unit 11 with formation of bundle 12. Banknotes which are input into input unit 39 in vault control unit 7 are transported, if they are defective, after checking by a test unit (not shown) to disbursement unit 11 and if they are not defective, they are deposited in banknote repository 35 with conveying means 36. A banknote repository of this type with the pertinent conveying means is described for example in EP-A 0 290 731.

Figure 6:
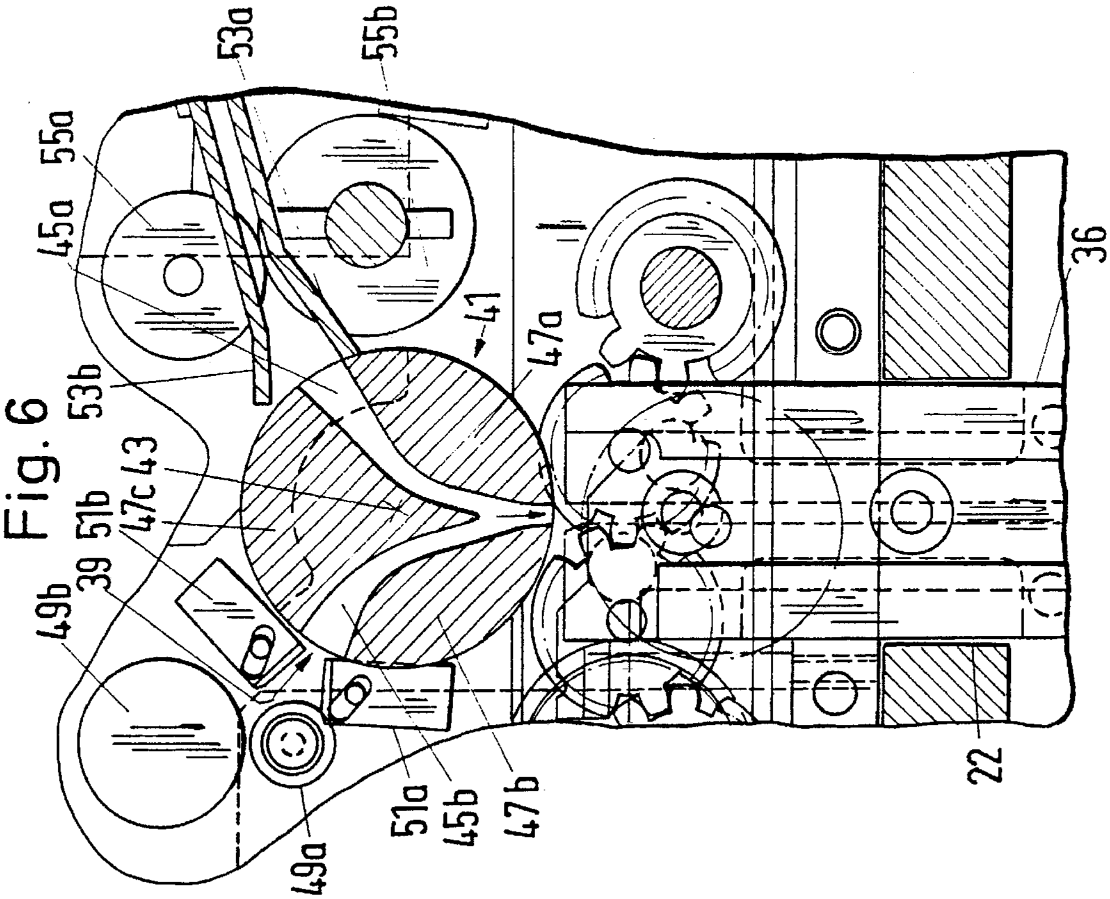
FIG. 6 shows the path selection element shown in FIG. 5 in a position in which the banknotes can be routed from the input unit to the money repository and, FIG. 7 shows a longitudinal section through the banknote input unit of the vault control unit of the cash vault.
Figure 5:
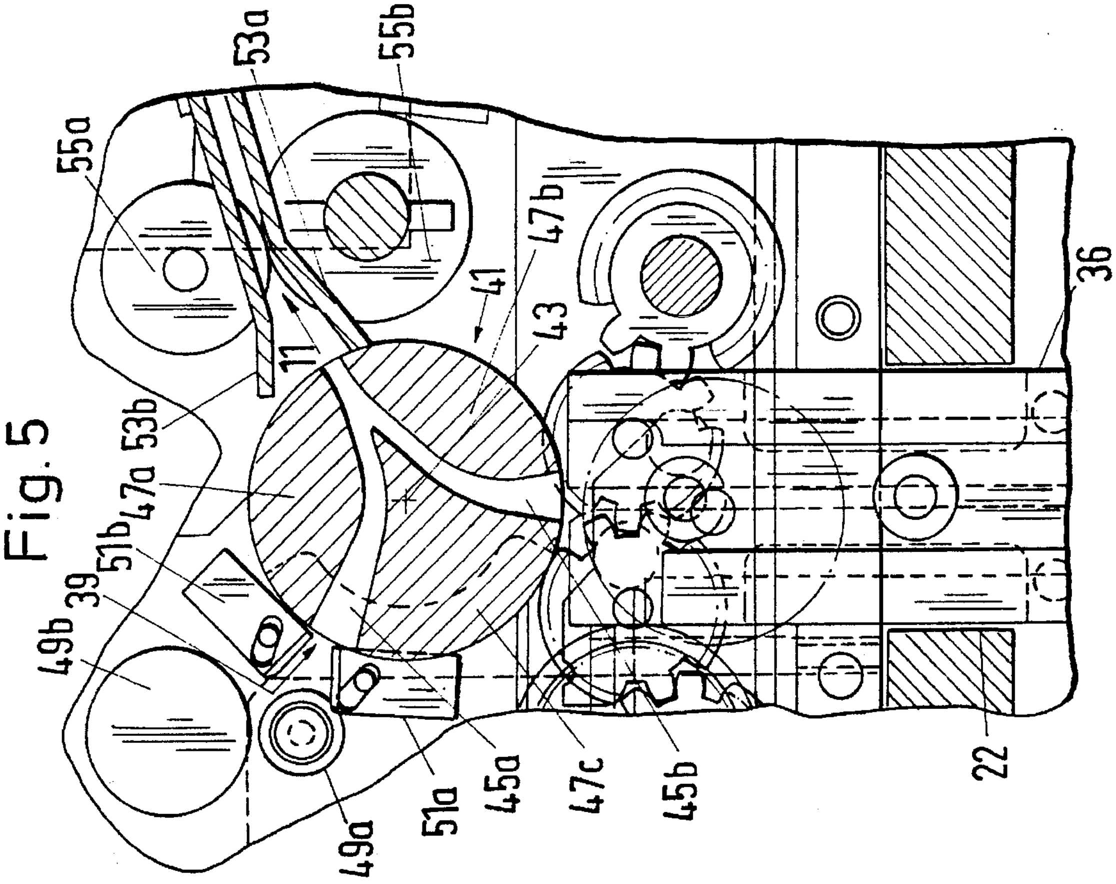
FIG. 5 shows a cross section through a path selection element of the cash vault in order to route the banknotes from the vault base unit of the cash vault into the disbursement unit of the vault control unit or from its input unit directly to its disbursement unit in the case of defective banknotes, in which in the position of the path selection element shown here the banknotes can be routed from the input unit and from the money repository to the disbursement unit.

Banknote paths are selected with path selection element 41 shown in FIGS. 5 and 6. Path selection element 41 is a circular cylinder which can be turned around its longitudinal axis 43 with a drive (not shown). The circular cylinder is traversed by two longitudinal slots 45*a* and 45*b* which run axially. Longitudinal slots 45*a* and 45*b* cut the circular cylinder with formation of three longitudinal cylindrical segments 47*a*, 47*b* and 47*c* which are mechanically held together on the cylinder bottom and/or head in a manner not shown.

Two longitudinal slots 45*a* and 45*b* are brought together at one point of the cylinder jacket with formation of a curved V. The ends of the V arms of longitudinal slots 45*a* and 45*b* are flared in the manner of a funnel in cross-section in order to guarantee good entry of banknotes.

FIG. 5 shows path selection element 41 in one position, in which banknotes originating from input unit 39, marked by an arrow with reference number 39, guided by guide rollers 49*a* and 49*b* and also routed through inlet auxiliary elements 51*a* and 51*b* are fed into longitudinal slot 45*a* and then leave the latter in the direction of disbursement unit 11. Routing to disbursement unit 11 takes place via guide plates 53*a* and 53*b* arranged in a funnel configuration, and a belt conveyor, in which only its rollers 55*a* and 55*b* are shown. Banknotes are transported again from input unit 39 to disbursement unit 11 when the banknotes are assessed as not satisfying the standard by a test unit which is not shown. Linear conveyance of the banknotes is not further detailed here since linear banknote conveyors are known.

From banknote repository 35 the banknotes are transported with belt conveyor means 36 which is not detailed through slot 22 in the upper vault wall of vault base unit 15 and through longitudinal slot 45*b* in path selection unit 41 likewise to disbursement unit 11.

If the banknotes are to be transported from input unit 39 to banknote repository 35, path selection element 41 is swivelled such that the funnel-shaped opening of longitudinal slot 45*b*, as shown in FIG. 6, can accommodate the banknotes originating from input unit 39.

The advantage of path selection element 41 formed compactly as a circular cylinder lies in its simple configuration and thus fault immunity relative to path selection elements which are composed of a number of deflection plates formed as shunts. Path selection element 41 can be called a "three-way valve" for leaf-shaped material. This path selection unit 41 can be used not only in selection of delivery paths for banknotes, but can also be used in other leaf-shaped material for selection of different transport paths. It can be used wherever quick sorting instructions must be followed. The speed of switching depends only on the moment of inertia of the path selection element which can be influenced among others by the choice of weight (especially by the choice of the material used) and the cylinder diameter. The diameter used depends on the one hand on the stiffness of the material—stiff sheet materials require a greater diameter—and on the other by the number of branch points. Instead of two longitudinal slots, only an individual one or even several can be used. The longitudinal cylinder segments also be hollow. In addition, only one "frame" of guides 45*a* and 45*b* can be used.

Figure 7:
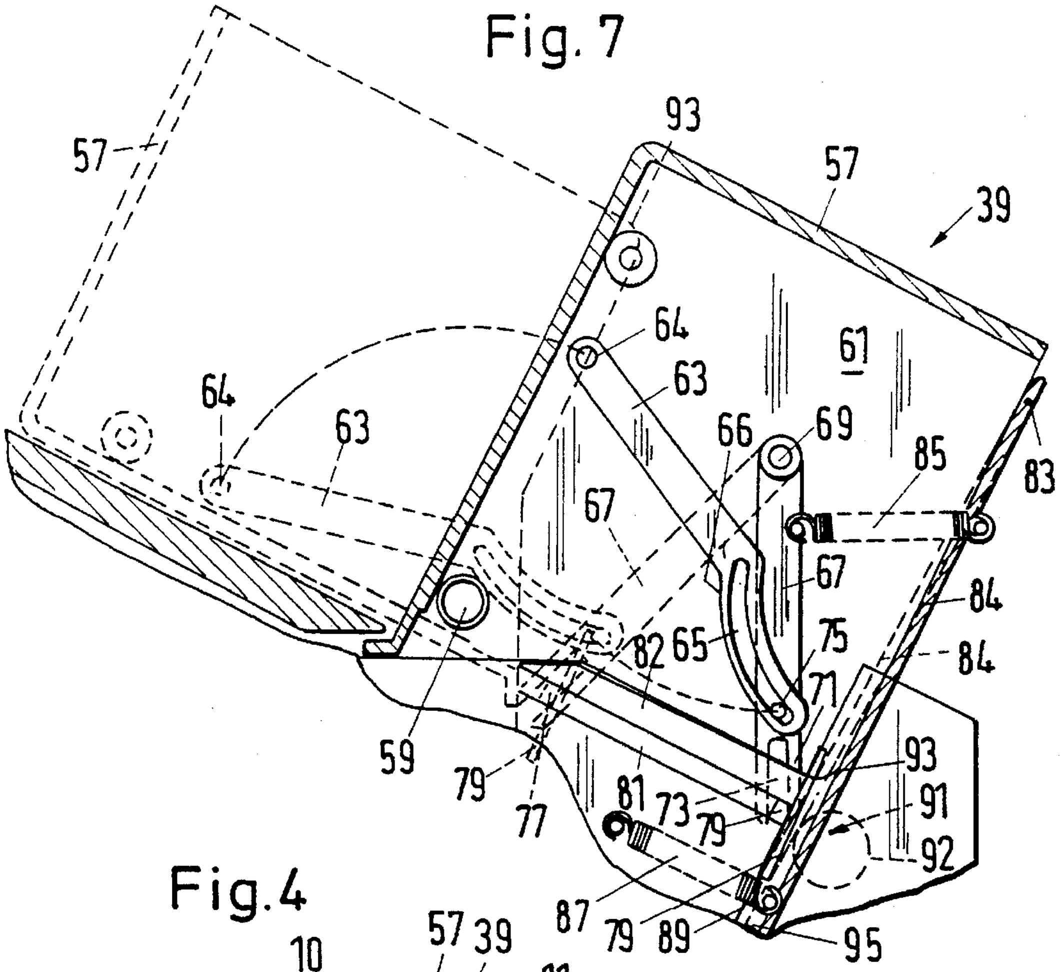

Input unit 39, as shown in FIG. 7, can be closed with hinged lid 57 as cover. The opened lid position is shown as cross-hatched in FIG. 7 and closed lid 57 as solid. Lid 57 can swivel around a lid hinge 59 in side wall 61 of input unit 39. On cover 57 straight lever 63 is pivotally supported which is bent in the shape of an arc away from a straight line on its end area 66 facing away from bearing 64 and there it has bent guide groove 65. On side wall 61, straight lever 67 is pivotally attached to drag bearing 69. Lever 67 is provided with slot 73 open towards the lever end in its end area 71 facing away from drag bearing 69. Above the slot base is cam 75 which fits into guide groove 65 of lever 63. Rectangular cam 77 of banknote pressure plate 79 engages slot 73. Cam 77 is guided in longitudinal slot 81 of plate 82 permanently connected to side wall 61. Longitudinal slot 81 runs perpendicularly to feed plate 84 which can be swivelled around bearing 83 in side wall 61; the banknotes can be pressed with banknote pressure plate 79 against the feed plate. Banknote pressure plate 79 can be pushed into a stable position by means of the rectangular shape of cam 77. Lever 67 is pretensioned with spring 85 attached to bearing wall 84 and thus draws banknote pressure plate 79 in the direction to feed plate 84. Feed plate 84 is pressed against stop 89 with spring 87. Stop plate 84 has recess 91 in which roller 92 is located for isolating the banknotes to be pressed against it. Lid 57 has projection 93 which is arranged such that with lid 57 closed, feed plate 84 is pushed away against the force of spring 87 and clears slot 95 through which roller 92 isolates the banknotes for processing by the test unit and can be pushed for subsequent storage or disbursement.

By moving lid 57 from the opening position to the closing position, banknotes inserted into input unit 39 are pressed against feed plate 84, the compression process being executed by banknote pressure plate 79 which is always parallel to the surface of feed plate 84 with a compression force which is always perpendicular to the surface of the pressure plate. The parallelism between banknote pressure plate 79 and feed plate 84 relates to the location of feed plate 84 in its position deflected by projection 93. In addition, only when lid 57 is closed is slot 95 cleared, by which then the banknotes are guided individually. The distance of banknote pressure plate 79 to feed plate 84 with lid 57 closed is determined by the thickness of banknote bundle 12.

Instead of a single slot 22 through the upper wall of vault base unit 15, as already mentioned, two separate slots 22*a*, 22*b* can be formed, the banknotes then being placed in the bank repository through one slot and being delivered through the other.

Instead of pushing conveying means 36 through individual slot 22, the slot can be made so narrow that only individual banknotes can be pushed through. In this case however the upper wall of vault base unit 15 should not exceed a thickness of 15 mm, since otherwise pushing through without problems is no longer possible.

We claim:

1. A cash vault system for use by two tellers (4*a*, 4*b*), comprising:

a vault base unit (15) with a banknote repository (35);

a vault control unit (7) disposed upon said vault base unit (15) and having a first side and a second side, said second side being opposite said first side;

a first and a second terminal (5*a*, 5*b*), each for use by one teller and the other teller, respectively, for retrieving banknotes from said banknote repository (35) and for operating said vault control unit (7);

said vault control unit (7) having only a single banknote disbursement unit (11) and only a single banknote input unit (39) for use by the two tellers (4*a*, 4*b*), said disbursement unit (11) including only a single deposition compartment for the banknotes to be dispensed by the tellers (4*a*, 4*b*)

one disbursement opening for the disbursement of the banknotes, and a two-part cover (13*a*, 13*b*) having a right-side part and a left-side part;

means for conveying (36) the banknotes between said banknote repository (35) and said deposition compartment;

said disbursement opening being accessible by each of the tellers (4*a*, 4*b*) from said opposite sides of said cash vault (1), said two-part cover covering said disbursement opening;

only said first cover-part being openable via said first terminal by the one teller for retrieving the banknotes; and only said second cover-part being openable via said second terminal by the other teller for retrieving the banknotes.

2. The cash vault system according to claim 1, wherein said disbursement unit (11) is disposed on an upper side of said vault control unit (7) and is operable by each of the tellers (4*a*, 4*b*) from said first side and said second side, respectively.

3. The cash vault system according to claim 1, wherein said disbursement opening (11) is formed as a trapezoidal longitudinal opening running horizontally, with open front sides.

4. The cash vault system according to claim 3, wherein said right-side part and said left-side part are moveable horizontally and perpendicularly with respect to said longitudinal opening and wherein each of said cover parts (13*a*, 13*b*) has a recess corresponding to the cross section of said longitudinal opening.

5. The cash vault system according to claim 1, wherein said vault control unit (7) is selectively detachable from said vault base unit (15), said vault base unit having a top side cover, said top side cover having a continuously extending portion with only one narrow slot therethrough for permitting passage of the banknotes between said vault control unit (7) and said banknote repository (35).

6. The cash vault system according to claim 1, comprising a bar-shaped path selection element (41) rotatable about a longitudinal axis (43) thereof and having at least one longitudinal slot **(45*a*, 45*b*), said path selection element (41) being used for alternately guiding the banknotes from said banknote input unit (39) toward said banknote repository (35) or toward said deposition compartment or from said banknote repository (35)** toward said deposition compartment.

7. The cash vault system according to claim 6, wherein said bar-shaped path selection element (41) has two longitudinal slots **(45*a*, 45*b*), said slots (45*a*, 45*b*) being disposed to form a curved V-shape in a cross-section perpendicular to said longitudinal axis (43), and each of said two slots (45*a*, 45*b*)** having a funnel shaped inlet.

8. The cash vault according to claim 1, wherein said banknote input unit (39) includes an input opening and a hinged lid (57) for closing said opening, a two-arm lever arrangement (63, 67) with one lever carried on said lid (57), a feed plate (84), a banknote pressure plate (79) for pressing the banknotes together, and at least one guide element (91) for said banknote pressure plate (79), said lid (57) being closed and the banknotes being pressed against said feeding plate (84) by said two-arm lever arrangement (63, 67) for singling banknotes, and said guide element (91) guiding said banknote pressure plate (79) perpendicular to said feedplate (84) as said lid is being closed.

* * * * *